(12) United States Patent
Wang et al.

(10) Patent No.: US 12,101,490 B2
(45) Date of Patent: Sep. 24, 2024

(54) METHOD, ELECTRONIC DEVICE, AND COMPUTER PROGRAM PRODUCT FOR PROCESSING DATA

(71) Applicant: Dell Products L.P., Round Rock, TX (US)

(72) Inventors: Zijia Wang, WeiFang (CN); Danqing Sha, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 442 days.

(21) Appl. No.: 17/680,986

(22) Filed: Feb. 25, 2022

(65) Prior Publication Data
US 2023/0239481 A1 Jul. 27, 2023

(30) Foreign Application Priority Data
Jan. 21, 2022 (CN) .......................... 202210076612.3

(51) Int. Cl.
*H04N 19/17* (2014.01)
(52) U.S. Cl.
CPC .................... *H04N 19/17* (2014.11)
(58) Field of Classification Search
CPC .... H04N 19/154; H04N 19/625; H04N 19/46; H03M 13/255; H03M 13/05; G06T 1/00
See application file for complete search history.

(56) References Cited

U.S. PATENT DOCUMENTS

| | | | | | |
|---|---|---|---|---|---|
| 6,061,400 | A | * | 5/2000 | Pearlstein | H04N 19/51 375/240 |
| 6,148,033 | A | * | 11/2000 | Pearlstein | H04N 19/428 375/E7.176 |
| 6,171,824 | B1 | * | 1/2001 | Todaro | A61K 38/2093 435/69.7 |
| 6,370,192 | B1 | * | 4/2002 | Pearlstein | H04N 19/30 375/240 |
| 6,558,915 | B1 | * | 5/2003 | Tao | C12N 15/8243 435/254.2 |
| 6,668,018 | B2 | * | 12/2003 | Pearlstein | H04N 19/30 375/E7.256 |

(Continued)

OTHER PUBLICATIONS

J. Liu et al., "OPT: Omni-Perception Pre-Trainer for Cross-Modal Understanding and Generation," arXiv:2107.00249v2, Jul. 6, 2021, 10 pages.

(Continued)

*Primary Examiner* — Yosef Kassa
(74) *Attorney, Agent, or Firm* — Ryan, Mason & Lewis, LLP

(57) ABSTRACT

Embodiments of the present disclosure relate to a method, an electronic device, and a computer program product for processing data. The method includes determining encoded data for a target object by performing hybrid encoding on multiple types of data for the target object, the multiple types of data including image data of the target object. The method further includes determining, by transforming the encoded data, an invariant portion for a shape of the target object and a variable portion for an expression of the target object. The method improves data processing efficiency, saves time and computing resources, and reduces the amount of data transmission.

20 Claims, 5 Drawing Sheets

(56) References Cited

U.S. PATENT DOCUMENTS

| | | | | |
|---|---|---|---|---|
| 7,720,070 | B1 * | 5/2010 | Li | H04W 28/06 |
| | | | | 370/392 |
| 8,046,657 | B2 * | 10/2011 | Johannesson | H03M 13/255 |
| | | | | 714/752 |
| 8,116,373 | B2 * | 2/2012 | Base | H04N 19/154 |
| | | | | 382/238 |
| 10,491,240 | B1 * | 11/2019 | Dupont | G06F 16/9014 |
| 10,712,416 | B1 * | 7/2020 | Sandino | G06N 3/045 |

OTHER PUBLICATIONS

G. Gafni et al., "Dynamic Neural Radiance Fields for Monocular 4D Facial Avatar Reconstruction," arXiv:2012.03065v1, Dec. 5, 2020, 11 pages.

U.S. Appl. No. 17/588,515 filed in the name of Zijia Wang et al. filed Jan. 31, 2022, and entitled "Method, Electronic Device, and Computer Program Product for Training Model."

* cited by examiner

METHOD, ELECTRONIC DEVICE, AND COMPUTER PROGRAM PRODUCT FOR PROCESSING DATA

RELATED APPLICATION(S)

The present application claims priority to Chinese Patent Application No. 202210076612.3, filed Jan. 21, 2022, and entitled "Method, Electronic Device, and Computer Program Product for Processing Data," which is incorporated by reference herein in its entirety.

FIELD

Embodiments of the present disclosure relate to the field of data processing, and in particular, to a method, an electronic device, and a computer program product for processing data.

BACKGROUND

With the development of computer technologies, people have begun to use computer vision technologies to obtain information about a target object or an environment. This process is generally realized by processing collected pictures or videos. The computer vision processing includes image processing, pattern recognition or image recognition, scene analysis, image understanding, and the like. Processing images and understanding objects are core problems of computer vision. However, there are still many problems to be solved in the process of processing vision images.

SUMMARY

A method, an electronic device, and a computer program product for processing data are provided in embodiments of the present disclosure.

According to a first aspect of the present disclosure, a method for processing data is provided. The method includes determining encoded data for a target object by performing hybrid encoding on multiple types of data for the target object, the multiple types of data including image data of the target object. The method further includes determining, by transforming the encoded data, an invariant portion for a shape of the target object and a variable portion for an expression of the target object.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: determining encoded data for a target object by performing hybrid encoding on multiple types of data for the target object, the multiple types of data comprising image data of the target object; and determining, by transforming the encoded data, an invariant portion for a shape of the target object and a variable portion for an expression of the target object.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By further description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Example embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

As technology evolves, technology professionals have created many avatars. These avatars may be animated characters created by technology professionals or images of some characters captured by users. To augment expressions of these avatars, computing technology professionals may often apply expressions of other objects to these avatars.

In a conventional solution, a video image of a target object is generally uploaded to an edge server or a cloud server through a network. Then, the edge server or the cloud server processes the uploaded video, and then recognizes a corresponding expression therefrom and combines it with an avatar. However, uploading an entire video image to an edge server or a cloud server requires a lot of communication resources. Moreover, since the entire video needs to be processed on the edge server or cloud server, a lot of computing resources and time will be consumed at this moment.

In order to solve the above and other potential problems, an embodiment of the present disclosure provides a method for processing data. In the method, a computing device determines encoded data for a target object by performing hybrid encoding on multiple types of data for the target object, the multiple types of data including image data of the target object. Then, the computing device determines, by transforming the encoded data, an invariant portion for a shape of the target object and a variable portion for an expression of the target object. The method improves data processing efficiency, saves time and computing resources, and reduces the amount of data transmission.

Figure 1:
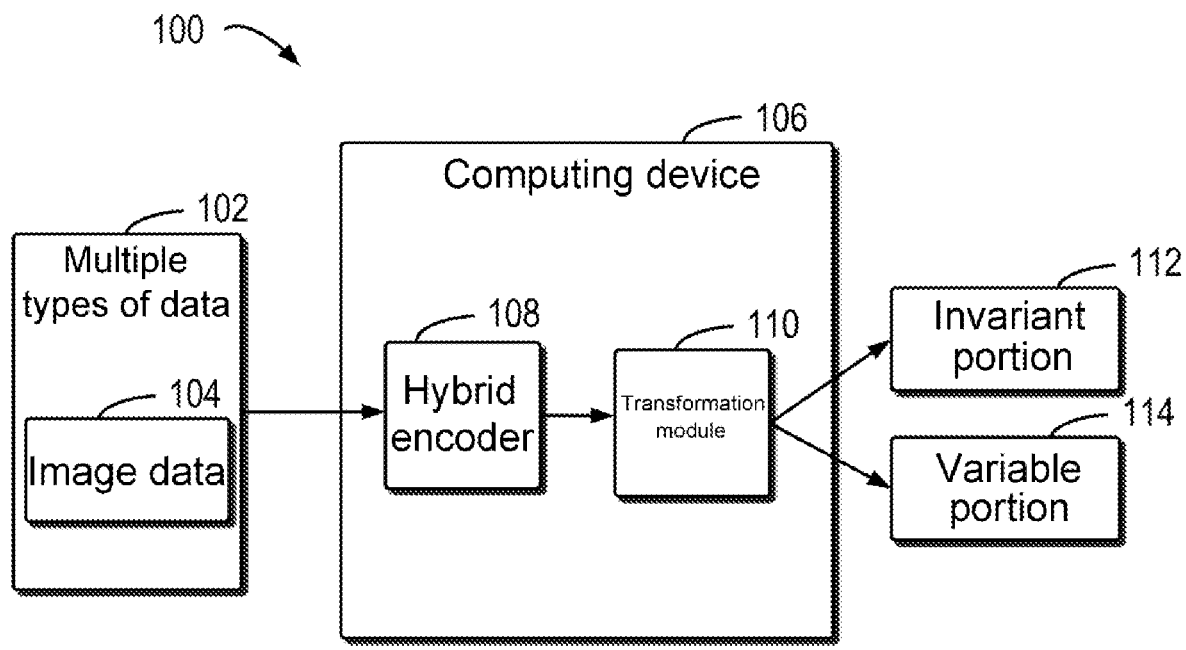
FIG. 1 is a schematic diagram of an example environment in which a device and/or a method according to an embodiment of the present disclosure can be implemented.

Embodiments of the present disclosure will be further described in detail with reference to the accompanying drawings below. FIG. 1 is a schematic diagram of example environment 100 in which embodiments of the present disclosure can be implemented.

As shown in FIG. 1, example environment 100 includes computing device 106. Computing device 106 is configured to receive multiple types of data 102 for processing.

Computing device 106 includes, but is not limited to, a personal computer, a server computer, a handheld or laptop device, a mobile device (such as a mobile phone, a personal digital assistant (PDA), and a media player), a multiprocessor system, a consumer electronic product, a minicomputer, a mainframe computer, a distributed computing environment including any of the above systems or devices, and the like.

Multiple types of data 102 in example environment 100 include image data 104 for a target object. In one example, image data 104 is a video frame or an image. In another example, image data 104 may be a video. The above examples are only intended to describe the present disclosure and are not specific limitations to the present disclosure.

Image data 104 is targeted to a target object, such as a human face, or targeted to a person or another suitable object. Multiple types of data 102 may further include at least one of: voice data and text data. Alternatively or additionally, the image data, voice data, and/or text data correspond to each other. For example, the image data is a video frame in a video or the video, and the voice data and the text data are corresponding voice data and text data of the video.

Multiple types of data 102 are then input to hybrid encoder 108 in computing device 106 to obtain encoded data. In some embodiments, hybrid encoder 108 includes a two-stage structure, the first stage of which is multiple encoders configured to encode different types of data, respectively. The second stage is a cross-modal encoder configured to perform uniform encoding on the multiple types of data encoded by the first stage structure. In one example, the first stage structure is three encoders configured to encode text, audio, and image data, respectively. The second stage structure is a cross-modal encoder configured to encode the three types of encoded data. In some embodiments, hybrid encoder 108 is any suitable encoder that can encode multiple types of data. The above examples are only intended to describe the present disclosure and are not specific limitations to the present disclosure.

Hybrid encoder 108 then inputs the encoded data to transformation module 110. The transformation module 110 performs matrix transformation on the encoded data to obtain invariant portion 112 for the target object and variable portion 114 for the target object.

In one example, if an input image is a human face with an expression, the invariant portion corresponds to the shape of the human face, such as the face shape and distances between the five sense organs, while the variable portion corresponds to the expression of the person, such as the size of the open mouth and the size of the open eyes. The above examples are only intended to describe the present disclosure and are not specific limitations to the present disclosure. Variable portion 114 may then be applied to another object or avatar. For example, the expression is combined with another avatar in an avatar pool to generate an avatar with a new expression.

The method improves data processing efficiency, saves time and computing resources, and reduces the amount of data transmission.

Figure 2:
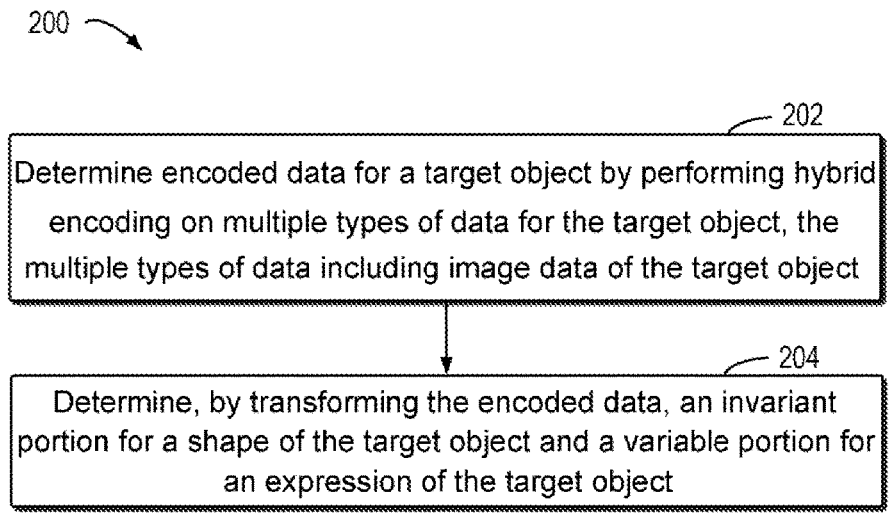
FIG. 2 is a flow chart of a method for processing data according to an embodiment of the present disclosure.

A block diagram of example environment 100 in which embodiments of the present disclosure can be implemented has been described above with reference to FIG. 1. A flow chart of method 200 for processing data according to an embodiment of the present disclosure will be described below with reference to FIG. 2. Method 200 may be performed at computing device 106 in FIG. 1 and any suitable computing device.

At block 202, computing device 106 determines encoded data for a target object by performing hybrid encoding on multiple types of data for the target object, the multiple types of data including image data of the target object.

In some embodiments, the multiple types of data further include at least one of: voice data or text data. Through the method, the information for determining a user expression by using text or voice can be increased, and the accuracy of the expression information is improved.

In some embodiments, computing device 106 encodes each of the multiple types of data. For example, the text, audio, and video are encoded by a text encoder, an audio encoder, and a video encoder. Then, computing device 106 performs hybrid encoding on the encoded multiple types of data to determine the encoded data. In one example, the encoded data is represented in the form of a matrix. The above examples are only intended to describe the present disclosure and are not specific limitations to the present disclosure.

In some embodiments, computing device 106 applies the multiple types of data to a cross-modal encoder to perform hybrid encoding on the multiple types of data, the cross-modal encoder being obtained by training with multiple types of sample data as an input and identified sample results as an output. The training processes of the encoders for specific types of data and the cross-modal encoder will be described with reference to FIG. 5 and FIG. 6.

At block 204, computing device 106 determines, by transforming the encoded data, an invariant portion for a shape of the target object and a variable portion for an expression of the target object.

In some embodiments, computing device 106 performs a first matrix transformation on the encoded data to determine the invariant portion. Computing device 106 further performs a second matrix transformation on the encoded data to determine the variable portion, the second matrix transformation being different from the first matrix transformation.

For example, for a matrix $\hat{V} \in R^{N \times d}$ output by a hybrid encoder, where N represents the number of data points processed by the encoder, such as the number of points in a point cloud or the number of pixels in an image, and d is the dimension of each data point. Therefore, matrix decomposition may be used to decompose $\hat{V}$ into matrices u and v, where u is used for representing the invariant portion, and v is used for representing the variable portion, as shown below:

$$\hat{V}=uv$$

where $u \in R^{N \times k}$, $v \in R^{N \times k}$, and k is a hidden dimension set by the user.

To obtain u and v through $\hat{V}$, Singular Value Decomposition (SVD) is used, and $\hat{V}$ may be expressed as the following formula:

$$\hat{V}=uSv^T$$

Therefore, u is an eigenvalue of $\hat{V}\hat{V}^T$, v is an eigenvalue of $\hat{V}^T\hat{V}$, and S is a single value of $\hat{V}$, which is a square root of $\hat{V}\hat{V}^T$ or $\hat{V}^T\hat{V}$. Therefore, the invariant portion u and the variable portion v can be obtained through the above matrix transformation.

Figure 3:
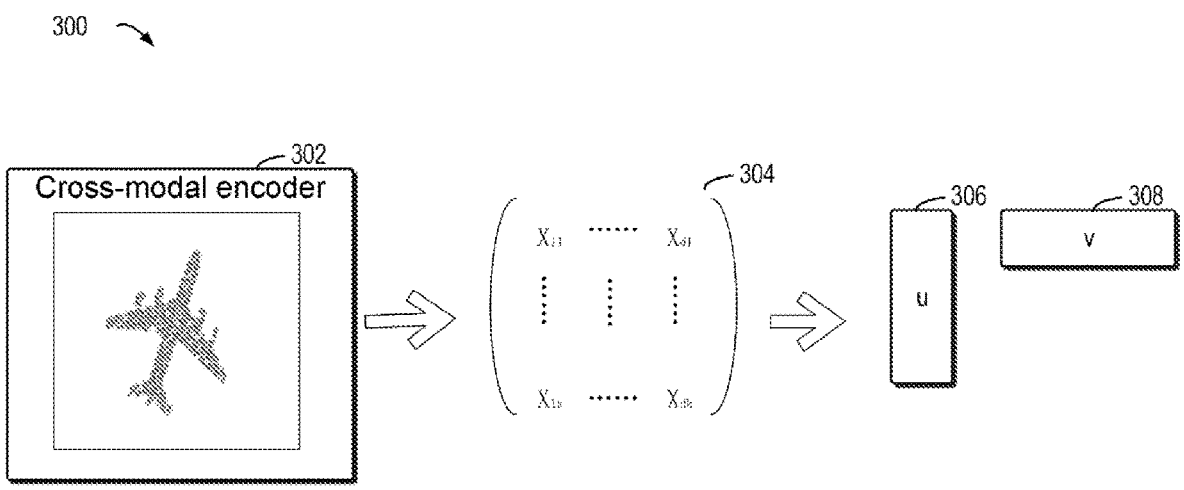
FIG. 3 is a schematic diagram of an example process for processing data by using a cross-modal encoder according to an embodiment of the present disclosure.

FIG. 3 shows a diagram of an example process 300 for processing data using a cross-modal encoder. As shown in FIG. 3, an aircraft image is processed by cross-modal encoder 302, and vector matrix 304 is output, which is then decomposed into invariant portion u 306 and variable portion v 308 through matrix decomposition. For the aircraft image, the invariant portion is, for example, a coordinates system, and the variable portion is coordinate points for the aircraft.

Figure 4:
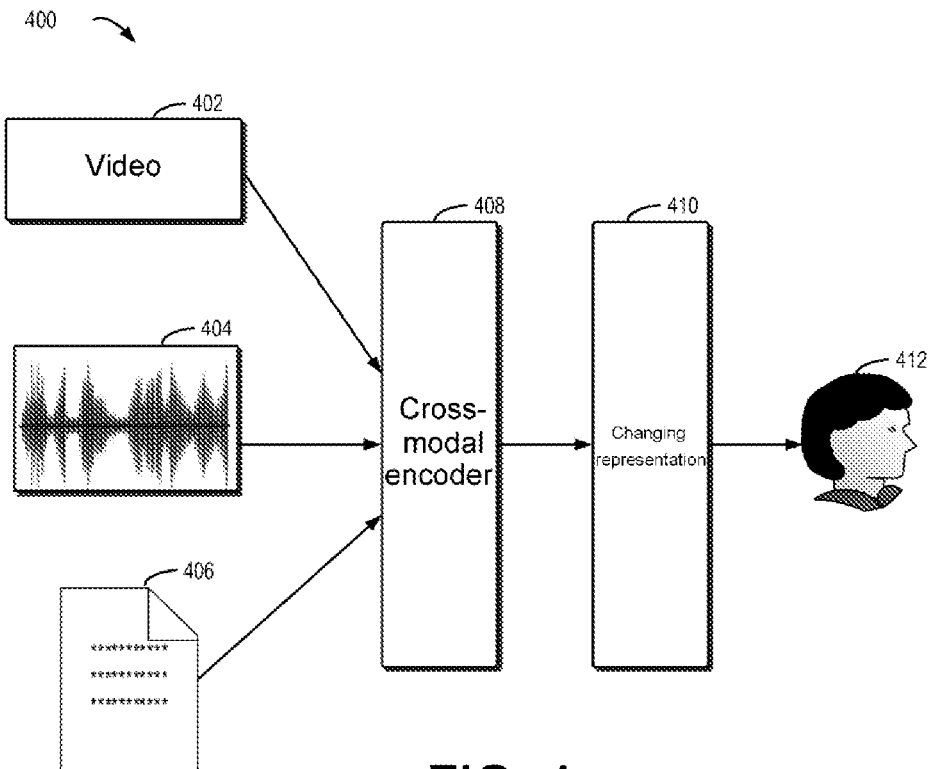
FIG. 4 is a schematic diagram of an example process for processing data according to an embodiment of the present disclosure.

Returning now to FIG. 2 to continue the description, in some embodiments, the variable portion may be applied to another object. A schematic diagram of example process 400 applying a changing representation according to an embodiment of the present disclosure will be described below with reference to FIG. 4. Process 400 may be performed at computing device 106 in FIG. 1 and any suitable computing device.

First, video 402, audio 404, and text 406 are input to cross-modal encoder 408 after being processed by their respective encoders. Then, changing representation 410, i.e., the variable portion, is generated by cross-modal encoder 408 and then incorporated into object or avatar 412.

The method improves data processing efficiency, saves time and computing resources, and reduces the amount of data transmission.

Figure 5:
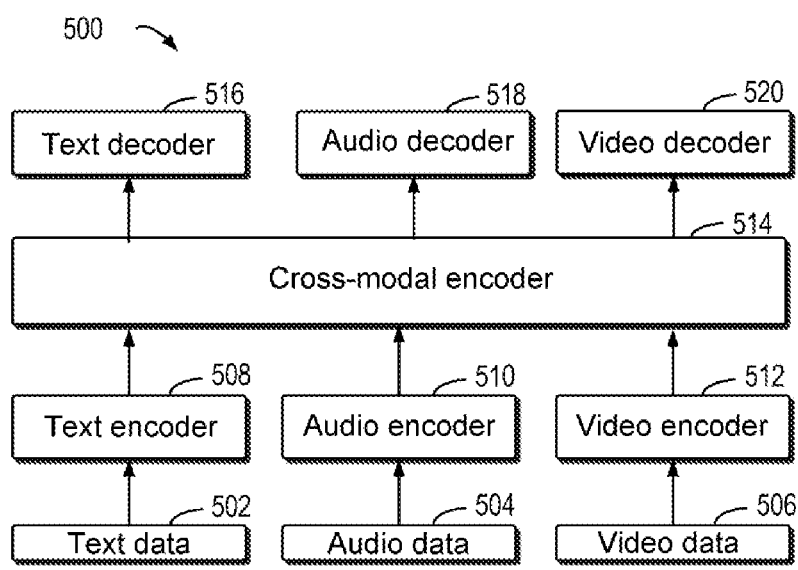
FIG. 5 is a schematic diagram of an example of a cross-modal architecture according to an embodiment of the present disclosure.

A flow chart of method 200 for processing data according to an embodiment of the present disclosure is described above with reference to FIG. 2 to FIG. 4. The training processes of the encoders for processing various types of data and the cross-modal encoder in embodiments of the present disclosure will be described with reference to FIG. 5 and FIG. 6. FIG. 5 is a schematic diagram of example 500 of a cross-modal architecture for training an encoder according to an embodiment of the present disclosure.

The cross-modal architecture includes text encoder 508, audio encoder 510, video encoder 512, cross-modal encoder 514, text decoder 516, audio decoder 518, and video decoder 520. During training of the cross-modal architecture, text data 502, audio data 504, and video data 506, which are input as samples, are input to text encoder 508, audio encoder 510, and video encoder 512 for encoding. The encoded data is then input to cross-modal encoder 514 for encoding, and then input to text decoder 516, audio decoder 518, and video decoder 520 for confirmation. The obtained data is compared with the input data, and then parameters of the encoders are adjusted until the input and the output are consistent.

In the training process, three levels of input adjustment are used for training. First, the first level is masking at a token level, that is, masking a certain data element in the input data, and then using the processed data as an input for training. The second level of adjustment is adjustment at a modal level, for training by masking the input to one of text decoder 516, audio decoder 518, and video decoder 520. The third level of adjustment is adjustment at a sampling level, for training by matching or not matching the three types of data input to cross-modal encoder 514. After the above training, the text encoder, the audio encoder, the video encoder, and the cross-modal encoder that can be used in the present disclosure can be obtained. FIG. 5 is just an example, and a cross-modal encoder for any type of data encoder can be trained in the manner of FIG. 5.

Figure 6:
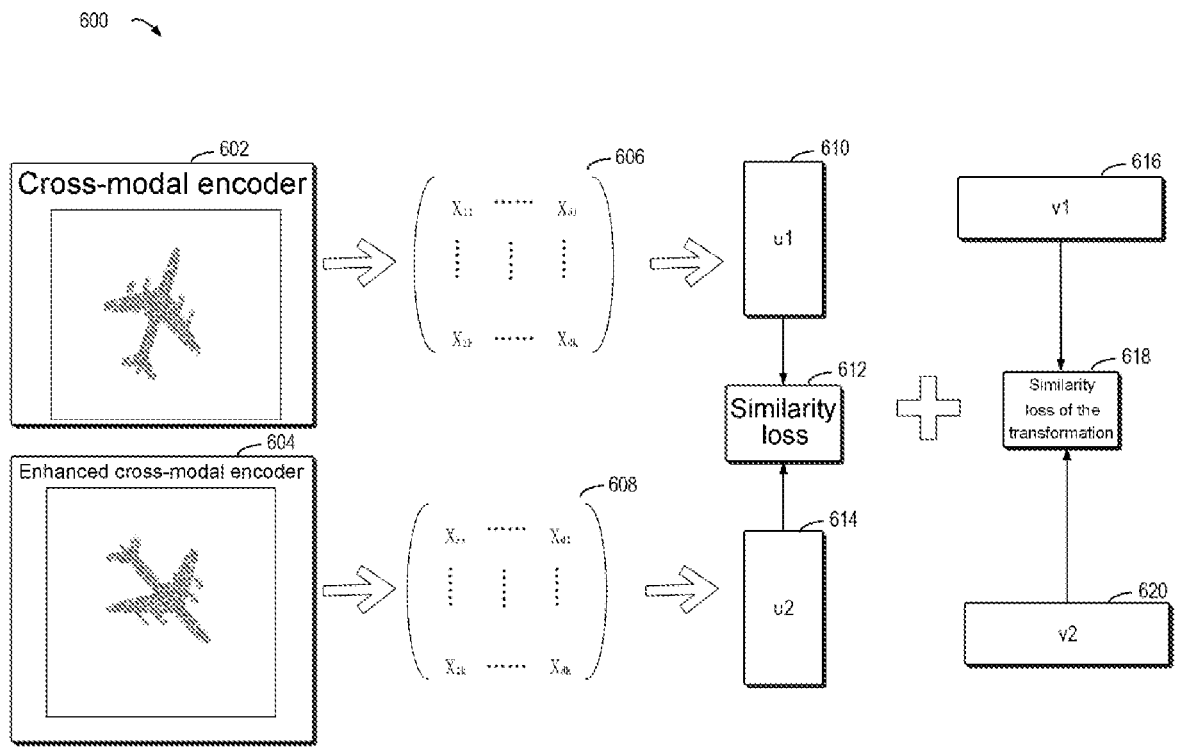
FIG. 6 is a schematic diagram of a process for adjusting a cross-modal encoder according to an embodiment of the present disclosure.

FIG. 6 describes a schematic diagram of process 600 for adjusting a cross-modal encoder according to an embodiment of the present disclosure.

Cross-modal encoder 602 is trained in FIG. 5. The aircraft image is processed by using cross-modal encoder 602 to obtain matrix 606, and then matrix decomposition is performed to obtain u1 610 and v1 616, which represent invariant information and variable information, respectively.

The rotated aircraft image is then input to enhanced cross-modal encoder 604. Enhanced cross-modal encoder 604 in an initial state is the same as cross-modal encoder 602, or initial enhanced cross-modal encoder 604 is cross-modal encoder 602.

Second matrix 608 is obtained after the rotated image is processed by enhanced cross-modal encoder 604, which is then matrix-decomposed to obtain invariant portion u2 614 and variable median v2 620. Similarity loss 612 between u1 610 and u2 614 may then be calculated:

$$L_s=sim(u_1,u_2)$$

where sim( ) represents a similarity measure. For example, it may be a cosine similarity.

Then, for v1 616 and v2 620, similarity loss 618 of the transformation is calculated, which is:

$$L_v=\text{trans}(v_1,\text{trans}(v_2))$$

where trans( ) represents a linear transformation function, which may also be learned and adjusted. The overall loss is then determined based on the above two losses:

$$L=L_s+L_v$$

A suitable trans( ) function and the enhanced cross-modal encoder are obtained by adjusting coefficients of trans( ) and parameters of enhanced cross-modal encoder 604 so that the value of the overall loss function is less than a predetermined threshold.

The enhanced cross-modal encoder is combined with the previously trained encoders for different types of data to form trained encoders. In applications, the trained encoders are used for processing input data, and then matrix transformation is performed to obtain a changing portion.

The method improves data processing efficiency, saves time and computing resources, and reduces the amount of data transmission.

Figure 7:
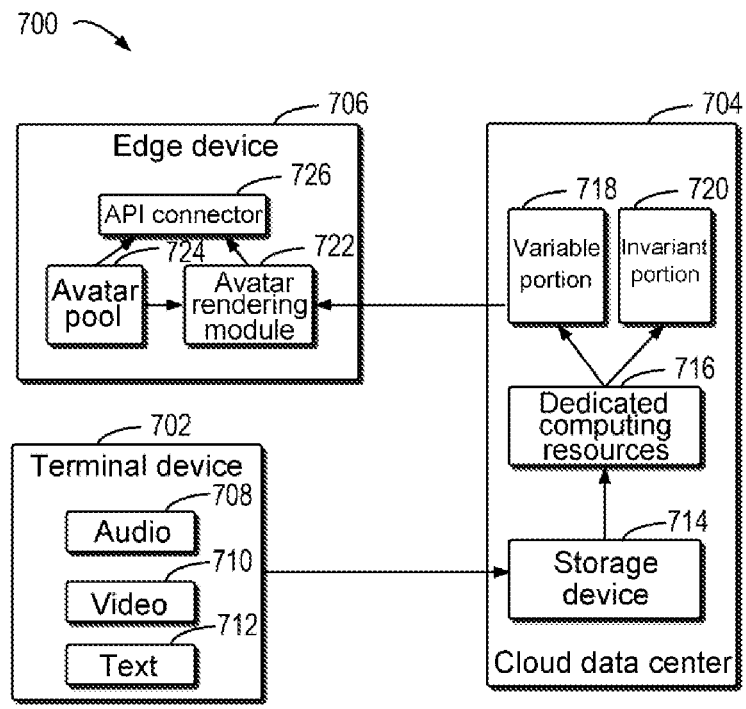
FIG. 7 is a schematic diagram of a configuration structure of various components according to an embodiment of the present disclosure.

The training processes of the encoders for processing various types of data and the cross-modal encoder in embodiments of the present disclosure are described above with reference to FIG. 5 and FIG. 6. A schematic diagram of configuration structure 700 of various components according to an embodiment of the present disclosure will be described below with reference to FIG. 7.

In configuration structure 700, terminal device 702 is configured to acquire audio 708, video 710, and text 712, and then transmit the above data to cloud data center 704. The data is stored in storage device 714 and then processed by dedicated computing resources 716 of the cloud data center, such as a graphics processing unit (GPU), and the data processing procedure described above is run to obtain variable portion 718 and invariant portion 720 of the data. Then, only variable portion 718 of the data is transmitted to edge device 706 for incorporation with avatars in avatar pool 724 by avatar rendering module 722 to be provided to application programming interface (API) connector 726. It is then provided to a corresponding application through API connector 726.

Through this arrangement, the amount of data transmission is reduced, data processing is accelerated, and efficiency is improved.

Figure 8:
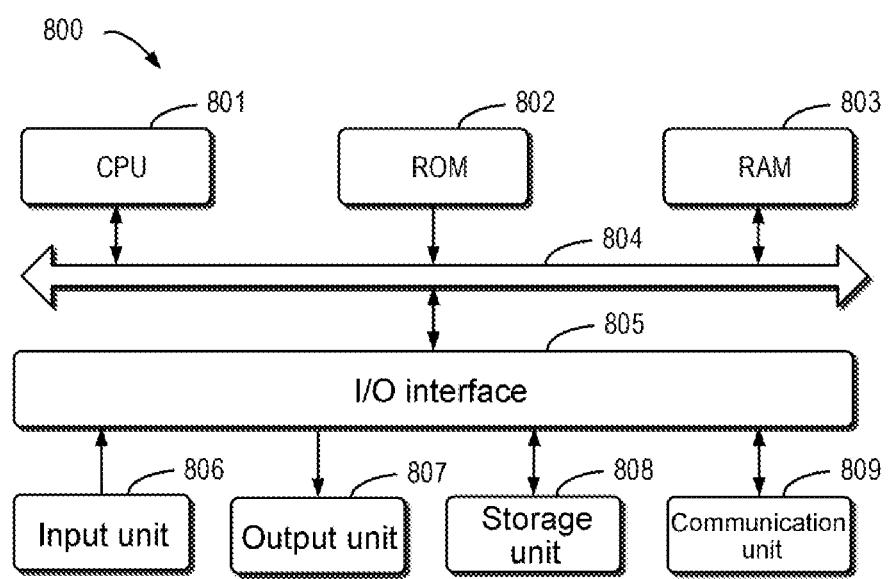
FIG. 8 is a schematic block diagram of an example device suitable for implementing an embodiment of content of the present disclosure.

FIG. 8 is a schematic block diagram of example device 800 that can be used to implement an embodiment of the present disclosure. Computing device 106 in FIG. 1 can be implemented using device 800. As shown in the figure, device 800 includes central processing unit (CPU) 801, which may execute various appropriate actions and processing in accordance with computer program instructions stored in read-only memory (ROM) 802 or computer program instructions loaded from storage unit 808 onto random access memory (RAM) 803. Various programs and data required for the operation of device 800 may also be stored in RAM 803. CPU 801, ROM 802, and RAM 803 are connected to each other through bus 804. Input/Output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various processes and processing described above, such as method 200 and processes 300, 400, and/or 600, may be performed by CPU 801. For example, in some embodiments, method 200 and/or one or more of processes 300, 400, and 600 may be implemented as a computer software program that is tangibly included in a machine-readable medium such as storage unit 808. In some embodiments, part or all of the computer program may be loaded and/or installed onto device 800 via ROM 802 and/or communication unit 809. When the computer program is loaded into RAM 803 and executed by CPU 801, one or more actions of method 200 and processes 300, 400, and/or 600 described above may be performed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method for processing data, comprising:
   determining encoded data for a target object by performing hybrid encoding on multiple types of data for the target object, the multiple types of data comprising image data of the target object; and
   determining, by transforming the encoded data, an invariant portion for a shape of the target object and a variable portion for an expression of the target object;
   wherein determining the invariant portion and the variable portion comprises:
   performing a first matrix transformation on the encoded data to determine the invariant portion; and
   performing a second matrix transformation on the encoded data to determine the variable portion, the second matrix transformation being different from the first matrix transformation.

2. The method according to claim 1, wherein determining the encoded data comprises:
   encoding each type of data in the multiple types of data; and
   performing hybrid encoding on the encoded multiple types of data to determine the encoded data.

3. The method according to claim 1, wherein determining the encoded data comprises:
   applying multiple types of data to a cross-modal encoder to perform hybrid encoding on the multiple types of data, the cross-modal encoder being obtained by training with multiple types of sample data as an input and identified sample results as an output.

4. The method according to claim 1, wherein the multiple types of data further comprise at least one of: voice data or text data.

5. The method according to claim 1, wherein the variable portion is applicable to another object.

6. The method according to claim 1, further comprising processing the invariant portion and the variable portion to generate an avatar based on the target object.

7. The method according to claim 1, wherein the invariant portion and the variable portion are determined in a cloud data center and at least the variable portion is sent from the cloud data center to an avatar rendering module in an edge device.

8. The method according to claim 1, wherein the variable portion is combined with at least portions of an existing avatar in an avatar pool of an edge device to generate an avatar having the expression of the target object.

9. The method according to claim 1, wherein the invariant portion and the variable portion are determined at least in part utilizing singular value decomposition (SVD) as applied to a matrix output of a hybrid encoder.

10. The method according to claim 1, wherein determining the encoded data comprises determining the encoded data in a hybrid encoder having a multiple-stage structure, a first one of the stages of the multiple-stage structure comprising multiple separate encoders configured to encode respective different types of data, and a second one of the stages of the multiple-stage structure comprising a cross-modal encoder configured to perform uniform encoding on the multiple types of data as encoded by respective separate encoders of the first stage of the multiple-stage structure.

11. An electronic device, comprising:
    at least one processor; and
    a memory coupled to the at least one processor and having instructions stored therein, wherein the instructions, when executed by the at least one processor, cause the electronic device to perform actions comprising:

determining encoded data for a target object by performing hybrid encoding on multiple types of data for the target object, the multiple types of data comprising image data of the target object; and determining, by transforming the encoded data, an invariant portion for a shape of the target object and a variable portion for an expression of the target object;

wherein determining the invariant portion and the variable portion comprises:

performing a first matrix transformation on the encoded data to determine the invariant portion; and performing a second matrix transformation on the encoded data to determine the variable portion, the second matrix transformation being different from the first matrix transformation.

12. The electronic device according to claim 11, wherein determining the encoded data comprises:

encoding each type of data in the multiple types of data; and performing hybrid encoding on the encoded multiple types of data to determine the encoded data.

13. The electronic device according to claim 11, wherein determining the encoded data comprises:

applying multiple types of data to a cross-modal encoder to perform hybrid encoding on the multiple types of data, the cross-modal encoder being obtained by training with multiple types of sample data as an input and identified sample results as an output.

14. The electronic device according to claim 11, wherein the multiple types of data further comprise at least one of: voice data or text data.

15. The electronic device according to claim 11, wherein the variable portion is applicable to another object.

16. A computer program product tangibly stored on a non-transitory computer-readable medium and including machine-executable instructions, wherein the machine-executable instructions, when executed by a machine, cause the machine to perform steps of a method for processing data, the method comprising:

determining encoded data for a target object by performing hybrid encoding on multiple types of data for the target object, the multiple types of data comprising image data of the target object; and determining, by transforming the encoded data, an invariant portion for a shape of the target object and a variable portion for an expression of the target object;

wherein determining the invariant portion and the variable portion comprises:

performing a first matrix transformation on the encoded data to determine the invariant portion; and performing a second matrix transformation on the encoded data to determine the variable portion, the second matrix transformation being different from the first matrix transformation.

17. The computer program product according to claim 16, wherein determining the encoded data comprises:

encoding each type of data in the multiple types of data; and performing hybrid encoding on the encoded multiple types of data to determine the encoded data.

18. The computer program product according to claim 16, wherein determining the encoded data comprises:

applying multiple types of data to a cross-modal encoder to perform hybrid encoding on the multiple types of data, the cross-modal encoder being obtained by training with multiple types of sample data as an input and identified sample results as an output.

19. The computer program product according to claim 16, wherein the multiple types of data further comprise at least one of: voice data or text data.

20. The computer program product according to claim 16, wherein the variable portion is applicable to another object.

* * * * *